Patented Mar. 30, 1954

2,673,870

UNITED STATES PATENT OFFICE 2,673,870

SILICON COMPOUNDS

Iral B. Johns, Jr., Dayton, Ohio, assignor to Monsanto Chemical Company, St. Louis, Mo., a corporation of Delaware No Drawing. Application April 27, 1951,
Serial No. 223,446

6 Claims. (Cl. 260—448.8)

The present invention relates to methods of preparing silicon compounds and deals more particularly with certain organic compounds of silicon obtained from such reaction products.

An object of the present invention is to prepare from readily available, inexpensive starting materials, intermediates which may be employed to give good yields of polysilicates. Another object of the invention is the preparation of mixtures of silicon disulfide and a compound containing only the elements silicon, sulfur and oxygen, which mixtures may be employed for the preparation of valuable organic silicon compounds. Still another object of the invention is the preparation of mixtures of orthosilicates and polysilicates from inexpensive raw materials.

These and other objects of the invention which will be hereinafter disclosed are provided by the following invention wherein there are prepared reaction products comprising silicon disulfide and a compound containing only the elements silicon, oxygen and sulfur by ignition of a mixture of silicon, sulfur and silica; and the resulting product is contacted with an organic hydroxy compound having the general formula ROH in which R is selected from the class consisting of alkyl, cycloalkyl, aryl, alkaryl and aralkyl radicals.

The product obtained by ignition of a mixture of silicon, silica and sulfur consists essentially of a mixture of silicon disulfide with a compound which is probably silicon oxysulfide, but which can be correctly described only in terms of the elements of which it is composed, i. e., as a compound containing only silicon, oxygen and sulfur. X-ray analysis of the ignition product shows the absence of elemental silicon, the presence of a considerably diminished quantity of silica over that present in the original reaction mixture, and also the presence of silicon disulfide. The presence of a compound containing the elements silicon, oxygen and sulfur can be ascertained only by the nature of the products which are formed by reaction of the ignition product with an organic hydroxy compound. Upon treating the ignition product with such a hydroxy compound there is obtained not only the orthosilicate which could be expected by the reaction of silicon disulfide and the hydroxy compound according to the scheme

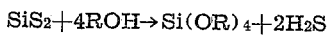

but also a series of polysilicates having the general formula:

Compounds having the above general formula can be formed only if a material supplying the necessary oxygen is present in the reaction mixture. Since no water is present during the preparation of the mixture of orthosilicates and polysilicates, the formation of the latter in yields which equal those of the orthosilicates, shows the presence of an oxygen-containing compound of silicon and sulfur in the ignition product.

While the prior art shows the production of polysilicates by a variety of procedures, e. g., by esterification of polysilicic acids, by reaction of silicon oxychloride with alcohols or phenols or, as in the Italian Patent No. 436,808, to Lamberto Malatesta, dated June 14, 1948, by the reaction of silicon disulfide with aqueous alcohols, the prior methods have been of little commercial interest because either the initial materials were difficultly obtainable or because the yields of the polysilicates were too low for practical application. The silicon disulfide of the Malatesta process is obtainable only at the expense of employing only elemental silicon as the silicon source. In the present process half of the silicon present in the ester products is derived from silica. That as cheap a source as silica can be utilized directly for the production of the hitherto difficultly obtainable organic silicates constitutes a major advancement in the art.

In preparing the mixture of silicon sulfide and the silicon-oxygen-sulfur compound of the present invention, I mix silicon with silica and sulfur in a molar proportion which is advantageously 1:1:2, but which may deviate from that value in any way, depending upon the proportion of silicon disulfide and the silicon-oxygen-sulfur compound desired in the ignition product. Since the reaction is assumed to proceed substantially according to the scheme.

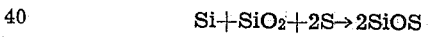

stoichiometric proportions of the reactants are advantageously employed. The formation of silicon disulfide from its elements is known to be a highly exothermic reaction; and while neither the identity of the present ignition products nor the responsible reaction mechanism are known it may be assumed that the extreme heat which is developed by the formation of silicon disulfide permits the formation of a silicon-oxygen-sulfur compound which while probably silicon oxysulfide may be a cyclic thioether, or a polymer of either the silicon oxysulfide or the cyclic compound.

In order to retain the exothermic reaction heat of the silicon-sulfur reaction, so that it can be utilized for the silica-sulfur reaction, it is advantageous to employ in the reaction mixture a small quantity, say from 0.5% to 5.0% by weight of the total weight of the silicon, silica and sulfur, of a heat-producing substance. The peroxides of barium, sodium or potassium are particularly suitable for this purpose, but other solid heat-producing media may be employed.

Ignition of the mixture of silicon, sulfur and silica and, if desired, heat-producing agent, may be effected by subjecting the mixture to a temperature of, say, at least 2000° C. and preferably of at least 2500° C. to 3,500° C. Temperatures of this magnitude may be readily attained by employing thermite ignition; i. e., by using the heat which is liberated in the reaction of a mixture of aluminum and an oxide of a weaker metal. The charge of silicon, silica and sulfur is contained in a highly heat-resistant vessel, e. g., a fire-clay crucible. The thermite, say, a mixture of aluminum and ferric oxide, is placed in the charge, and the mixture is ignited electrically and/or by a primer such as magnesium powder or magnesium ribbon. Heat evolved in the thermite reaction then effects ignition of the silicon-silica-sulfur charge. The product of this ignition is generally a brownish, friable material which, as previously stated contains no elemental silicon, only a very small quantity of silica and silicon disulfide and the silicon-oxygen-sulfur compound. The proportion of the last two compounds with respect to each other, when the composition of the initial reaction mixture observes stoichiometric proportions, is generally in the order of 1:1.

This ignition product is employed directly, without further treatment or isolation of constitutents of the preparation of organic esters of orthosilicic or polysilicic acids. The proportion of orthosilicates to polysilicates which is obtained depends upon the proportion of silicon disulfide to the silicon-oxygen-sulfur compound which is present in the ignition product.

Saturated organic hydroxy compounds, generally, may be employed for the preparation of the silicates; advantageously there may be employed saturated alcohols or phenols of from 1 to 18 carbon atoms, e. g., aliphatic alcohols such as methanol, ethanol, isopropanol, n-butanol, tert-n-butanol, n-hexanol, n-heptanol, 2-ethylhexanol, n-octanol, lauryl alcohol, octadecyl alcohol etc., the aralkyl alcohols such as benzyl alcohol or 2-phenylethanol; and phenols such as phenol, cresol, p-ethylphenol, β-naphthol, 2-hydroxybiphenyl, etc.

Reaction of the ignition product with the hydroxy compounds is effected readily by simply contacting the ignition product with the hydroxy compound and allowing the resulting mixture to stand at ordinary or increased temperatures until formation of the silicates and evolution of hydrogen sulfide are complete. Advantageously, increased temperatures, say, the refluxing temperatures of the reaction mixtures, are employed. The proportion of hydroxy compound to the ignition product employed in the reaction mixture is apparently of little importance, the formation of some of the mixture of orthosilicates and polysilicates occurring irrespective of whether one or the other reactant is present in excess. However, in order to assure complete reaction of the ignition product an excess of the more readily available hydroxy compound is employed. The reaction product thus obtained generally consists of some unreacted initial reactants, the orthosilicate and a mixture of polysilicates of varying degrees of polymerization.

The unreacted materials are readily removed from the reaction product by distillation and the resulting mixture of orthosilicate and polysilicates may be employed as such, for a wide variety of commercial purposes, e. g., in the preparation of heat-resistant adhesives and binders, in the formulation of protective coatings, for the waterproofing of textile, as functional fluids, etc. Or, if desired, the orthosilicate may be separated from the mixture by further fractionation to yield a residue consisting of only the polysilicates. While the orthosilicates may be regarded as byproducts when the polysilicates are the only desired materials, the orthosilicates themselves are of considerable commercial importance and the present process provides an inexpensive method for their production. In most instances, however, the mixtures of orthosilicates and polysilicates obtainable from the present process may be employed for functions previously assumed to be satisfactorily fulfilled only by the hitherto more difficultly available polysilicates e. g., the present orthosilicate-polysilicate mixtures are highly useful as heat transfer media, as additives to alkyd resins, for the purpose of improving hardness and the drying rate thereof, etc. When the products are to be used as liquid heat-responsive agents for thermostatic devices, however, the polysilicates are preferably employed in absence of substantial quantities of the orthosilicate. In this case the orthosilicate is removed by distillation. The residue comprises a series of polysilicates of varying degree of polymerization, i. e., polysilicates having the general formula $$Si_nO_{n-1}(OR)_{2n+2}$$

in which $n$ is greater than one and R is as herein defined. The individual members of the series are separable only with difficulty; however, since they resemble each other very much in properties, resolution of the mixture into its constituents is generally unnecessary. If desired, fractionation of the polysilicate residue to give fractions of polysilicates having a narrow range of molecular weights and polymerization degrees may be carried out.

The invention is illustrated, but not limited by the following examples.

*Example 1*

582 g. of a mixture of silicon, silica, sulfur and barium peroxide in which the $Si:SiO_2:S$ molar ratio was 1:1:2 and in which the barium peroxide was present in the amount of 4.5 g. of $BaO_2$/mole of Si, were placed in a fire clay crucible (130 x 200 mm.). A 4 ft.-length of Transite pipe was placed around the crucible to serve as a chimney for carrying away gases and in order to protect the charge from air moisture. A 110 volt-ignition unit was used for firing. Leads from the ignition unit were terminated with a 13 cm.-length of 30 gauge manganin wire which was wound in a small coil and inserted into the thermite charge. The thermite charge was placed in a cavity on the top center of the $Si-SiO_2-S-BaO_2$ mixture. The charge was ignited, the ignition product was allowed to cool, and broken up in a mortar. There was thus obtained 560 g. of a mixture comprising silicon sulfide and a compound containing the elements Si, O and S.

506 g. of this mixture was placed in a 3,000 ml.

flask and sufficient anhydrous alcohol was added, dropwise, over a period of 4 hours to cover the solid material with from ¼ to ½ inch of liquid. The resulting mixture was then refluxed for 2 hours, filtered, and the residue washed with five 400 ml. portions of alcohol. Fractionation of the combined washings and filtrate yielded the following:

I. B. P. 75–85° C. unreacted alcohol.
II. B. P. 55–110° C./10 mm., 153 g.; mostly tetraethyl orthosilicate.
III. B. P. 110–150° C./10 mm., 78.2 g.
IV. B. P. 150–210° C./10 mm., 72.6 g.

Analysis of fraction III showed it to correspond to the formula $Si_2O(OC_2H_5)_6$ i. e., hexaethyl disilicate. Analysis of fraction IV showed it to correspond with $Si_3O_2(OC_2H_5)_8$ i. e., octaethyl trisilicate.

Example 2

Two charges, each of which consisted of 28 g. (1 mole) of silicon, 64 g. (2 moles) of sulfur, 60 g. (1 mole) of silica and 3 g. of barium peroxide were respectively ignited as in Example 1. There was thus obtained 143 g. of ignition product from one charge and 143.5 g. from the other charge. To the cooled and fragmented, combined ignition products (286.5 g.) there was then slowly added 500 g. of 2-ethylhexanol and the resulting mixture was refluxed for 2 hours. The reaction mixture was then filtered, and the residue washed with two 100 ml. portions of 2-ethylhexanol and five 200 ml. portions of acetone. Fractionation of the combined washings and filtrate gave the following:

I. B. P. <100° C., acetone.
II. B. P. 175–185° C., 2-ethylhexanol.
III. B. P. <220° C./4 mm., 47 g.
IV. B. P. 220–260° C./4 mm., 35.7 g.
V. B. P. >260° C./4 mm., 85.2 g.

Fraction III comprised chiefly tetrakis (2-ethylhexyl) orthosilicate. Fraction IV had an average molecular weight of 655 (as determined cryoscopically in benzene), hence it is probably a mixture of tetrakis-(2-ethylhexyl) orthosilicate and hexakis-(2-ethylhexyl) disilicate i. e., $$Si_2O[OCH_2CH(C_2H_5)C_4H_9]_6$$

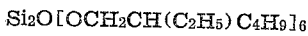

Fraction IV was found to have an average molecular weight of 1178 (cryoscopic determination in benzene). Since the molecular weight of $$Si_3O_2[OCH_2CH(C_2H_5)C_4H_9]_8$$

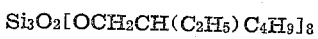

is 1120, this fraction is chiefly octakis-(2-ethylhexyl) trisilicate probably with small amounts of the corresponding disilicate and tetrasilicate.

Example 3

A mixture consisting of 25 g. of sulfur, 10 g. of silicon, 21.5 g. of silica and 1 g. of barium peroxide was ignited as in Example 1. There was thus obtained 52.0 g. of a light brown ignition product which could be easily broken up by hand.

This entire ignition product was finely powdered in a mortar, 120 g. of phenol were added, and the mixture was thoroughly stirred. It was then placed in an iron retort, the latter was inserted into a furnace, and the temperature of the furnace was then gradually raised to 550° C. The unreacted phenol in the resulting reaction mixture was removed by distilling at below 375° C. and the gummy mass remaining in the retort was removed and extracted with benzene.

Distillation of the benzene extract gave, after removal of benzene and unreacted phenol, 9.8 g. of tetraphenyl orthosilicate, B. P. 220–230° C./1 mm., and 33.2 g. of a polymeric material boiling above 290° C./1 mm., having a molecular weight of 930 (as determined cryoscopically in benzene). This corresponds to a mixture of octaphenyl trisilicate (mol. wt. 860) and decaphenyl tetrasilicate (molecular weight 1090). The polymeric material analyzed as follows:

Percent C, 62.72
Percent H, 4.34
Percent Si, 10.85
Percent S, 1.09

The above analysis substantiates the presence of a polymeric phenyl silicate.

Operating as in the above example other alcohols or phenols may be similarly reacted with the silicon-silica-sulfur ignition product to yield mixtures of orthosilicates and polysilicates. Thus, instead of the ethanol or 2-ethylhexanol or phenol employed above, there may be used e. g., propyl alcohol, amyl alcohol, benzyl alcohol or p-cresol to yield e. g., a mixture of tetrapropyl orthosilicate and polypropyl polysilicates, a mixture of tetraamyl orthosilicate and polyamyl polysilicates, tetrabenzyl orthosilicate and polybenzyl polysilicates, a mixture of tetra p-cresyl orthosilicate and poly-p-cresyl polysilicates. As may be realized by those skilled in the art, the reaction temperatures and times employed above may be widely varied, the temperature employed in preparing the silicates being a function of the reaction time. While generally the quantity of the alcohol or phenol used in the examples above was gauged to cover the solid component, lower and greater proportions of the hydroxy compound may be used.

What I claim is:

1. The process of preparing a mixture of an orthosilicate having the general formula $Si(OR)_4$ in which R is selected from the class consisting of alkyl, aryl, aralkyl and cycloalkyl radicals and polysilicates having the general formula $Si_nO_{n-1}(OR)_{2n+2}$ in which R is as herein defined and $n$ is an integer of at least 2, which comprises contacting, under anhydrous conditions a hydroxy compound having the general formula ROH in which R is selected from the class consisting of alkyl, aryl, aralkyl and cycloalkyl radicals with an ignition product comprising silicon disulfide and a compound containing the elements Si, O and S, the ignition product being obtained by igniting a mixture of silicon, sulfur and silicon dioxide.

2. The method of preparing a mixture of polysilicates having the general formula $Si_nO_{n-1}(OR)_{2n+2}$ in which R is selected from the class consisting of alkyl, aryl, aralkyl and cycloalkyl radicals and $n$ is an integer of at least 2, which comprises contacting under anhydrous conditions a hydroxy compound having the general formula ROH in which R is as herein defined, with an ignition product comprising silicon disulfide and a compound containing the elements Si, O and S, the ignition product being obtained by igniting a mixture of silicon, sulfur and silica; and recovering said mixture of polysilicates from the resulting reaction product.

3. The method of preparing polysilicates having the general formula $Si_nO_{n-1}(OR)_{2n+2}$ in which R is selected from the class consisting of alkyl, aryl, aralkyl and cycloalkyl radicals and $n$ is an integer of at least 2, which comprises refluxing under anhydrous conditions a hydroxy compound having the general formula ROH in which R is as defined above with an ignition product comprising silicon disulfide and a compound containing the elements Si, O and S, the ignition product being obtained by igniting a mixture of silicon, sulfur and silica; and recovering said polysilicates from the resulting reaction product.

4. The method of preparing a mixture of tetraethyl orthosilicates and polysilicates having the general formula $Si_nO_{n-1}(OC_2H_5)_{2n+2}$ in which $n$ is an integer of at least 2, which comprises refluxing under anhydrous conditions ethanol with an ignition product comprising silicon disulfide and a compound containing the elements Si, O and S, the ignition product being obtained by igniting a mixture of silicon, sulfur and silica.

5. The method of preparing a mixture of tetrakis-(2-ethylhexyl) orthosilicates and polysilicates having the general formula $$Si_nO_{n-1}[OCH_2CH(C_2H_5)C_4H_9]_{2n+2}$$

in which $n$ is an integer of at least 2, which comprises refluxing under anhydrous conditions 2-ethylhexanol with an ignition product comprising silicon disulfide and a compound containing the elements Si, O and S, the ignition product being obtained by igniting a mixture of silicon, sulfur and silica.

6. The method of preparing a mixture of tetraphenyl orthosilicates and polysilicates having the general formula $Si_nO_{n-1}(OC_6H_5)_{2n+2}$ in which $n$ is an integer of at least 2, which comprises refluxing under anhydrous conditions phenol with an ignition product comprising silicon disulfide and a compound containing the elements Si, O and S, the ignition product being obtained by igniting a mixture of silicon, sulfur and silica.

IRAL B. JOHNS, JR.

References Cited in the file of this patent

UNITED STATES PATENTS

| Number | Name | Date |
|---|---|---|
| 2,416,531 | Morrill | Feb. 25, 1947 |
| 2,569,746 | Culbertson et al. | Oct. 2, 1951 |
| 2,569,784 | Smith | Oct. 2, 1951 |
| 2,589,653 | Alvarez-Tostado | Mar. 18, 1952 |

FOREIGN PATENTS

| Number | Country | Date |
|---|---|---|
| 436,808 | Italy | June 14, 1948 |

OTHER REFERENCES

Malatesta: "Gazz. Chim. Ital.," vol. 78 (1948), pp. 753–63.